United States Patent [19]

Nadas et al.

[11] 4,431,089
[45] Feb. 14, 1984

[54] AUTOMATIC SLACK ADJUSTING DEVICE OF BRAKE LINKAGE

[75] Inventors: Julius Nadas, Eching, Fed. Rep. of Germany; Nils B. L. Sander, Osby, Sweden

[73] Assignee: Knorr-Bremse GmbH, Munich, Fed. Rep. of Germany

[21] Appl. No.: 350,101

[22] Filed: Feb. 18, 1982

[30] Foreign Application Priority Data

Feb. 19, 1981 [DE] Fed. Rep. of Germany ....... 3106178

[51] Int. Cl.³ .............................................. F16D 65/66
[52] U.S. Cl. ................................... 188/196 D; 188/202
[58] Field of Search ................... 188/199, 202, 196 D, 188/203

[56] References Cited

U.S. PATENT DOCUMENTS 3,326,335  6/1967  Billeter ........................... 189/196 D
3,595,347  7/1971  Billeter ............................... 188/202

Primary Examiner—Bruce H. Stoner, Jr.
Assistant Examiner—Alvin E. Oberley
Attorney, Agent, or Firm—Edmund M. Jaskiewicz

[57] ABSTRACT

The device automatically adjusts the slack in the brake linkage of railway vehicle during the braking process and has two telescoping rod members one of which is connected with a brake motor and the other is connected to the brake linkage. A nut, nonrotateably mounted on the brake linkage rod member, is threaded upon a rotateable spindle shaft which is axially moveable a limited distance within the brake motor rod member and is connected to this rod member by a control clutch. When the control clutch is stressed by torque, the control clutch member will become disengaged from the brake motor rod member to permit a relative adjustment between the two rod members to overcome any slack. When slack is overcome, a rotary clutch between the threaded spindle and the brake motor rod member will be engaged so that braking force can be transmitted between the rod members. A pretensioned spring stresses the brake motor rod member in the direction opposed to the braking force but does not exert any force upon the clutch control member.

11 Claims, 6 Drawing Figures

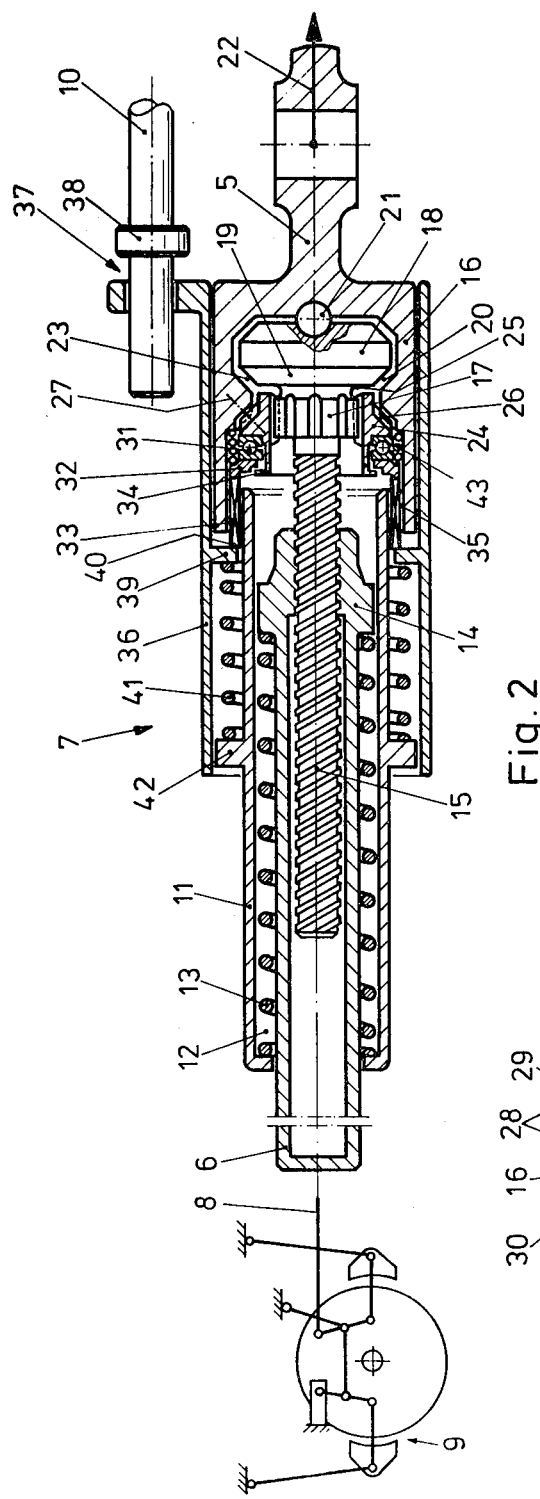
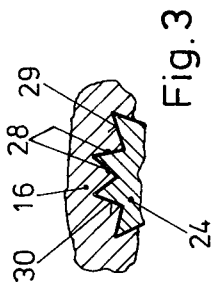

AUTOMATIC SLACK ADJUSTING DEVICE OF BRAKE LINKAGE

The present invention relates to a device for automatically adjusting the slack in the brake linkage of a rail vehicle and the like, more particularly, to such a device which completely and immediately adjusts the slack during the braking operation.

One form of an automatic device for adjusting the slack in a brake linkage, but particularly for rail vehicles, has two telescoping rod members at least one of which is tubular in form and is connected with a braking motor to produce a braking force and the other rod member is connected to the brake linkage of the vehicle. The rod members are coupled by a screw coupling which includes a nut threaded upon a spindle shaft having a non-self-locking thread. One of these threaded screw coupling members is rotatable and is axially immoveable within the tubular rod member. The other screw coupling member is nonrotateable and is rigidly connected with the brake linkage rod member. There is a moveable stop member which is spring loaded in the same direction as the braking force and is engageable with a stop member which, in the brake relase position, is spaced from the moveable stop member a distance corresponding to the desired slack in the brake linkage. There is a control clutch which, when engaged, connects the rotateable screw coupling member rigidly with a rod member and when stressed with torque in the direction of opening is stressed by an opening force which is weak with respect to the force exerted by a spring against the moveable stop member. A rotary clutch between the brake motor rod member and the rotateable screw coupling member can be engaged in a direction opposite to that of the control clutch and when engaged transmits the braking force. There is a pretensioned spring inserted between the two rod members and this spring urges the brake motor rod member in a direction opposite to the braking force direction.

One form of such an adjusting device as described above is disclosed in U.S. Pat. No. 3,326,335. This disclosed adjusting device has a rotateable screw coupling member constructed as a threaded spindle shaft and at one end is a ring flange which has conical clutch surfaces on both sides thereof. The conical clutch surface facing the direction of the braking force together with the corresponding clutch surfaace on one rod member forms a control clutch which, in the direction of opening, is stressed by a weak spring positioned between the one rod member and the threaded spindle shaft over an axial or thrust bearing. The other conical clutch surface of the ring flange which faces in the direction opposed to the braking force forms a rotary clutch which transmits the braking force through a corresponding mating surface similarly formed in one of the rod members and this rotary clutch is engageable in a direction opposite to the direction used by the control clutch. A pretensioned spring between the two rod members stresses the control clutch in its closing direction since this well known adjusting device is intended for installation in brake linkage under conditions which stress the brake linkage by transmitting braking force in the direction of vehicle movement. As a result, when braking occurs with a brake application stroke whose length is greater than the desired slack following the closing of the stop device which occurs after the desired slack distance has travelled, the control clutch will be unloaded by the force of the spring in the stop device but will still remain closed under the force of the pretensioned spring. The control clutch will not open until after actual engagement of the brake surfaces after traverse of the excessive brake application stroke has been completed and, without any adjusting action in the rod members, the brake force transmitting clutch is immediately closed and the braking force to firmly apply the brakes is transmitted by this closed clutch mechanism.

During the entire braking process and during the actual application of the braking force this adjusting device will provide no adjustment of the excessive brake application stroke. It is only during the subsequent brake relase operation that the excessive brake application stroke will be reduced to its desired value. This operation is disadvantageous since it can lead to brake failure if the excessive stroke of brake application is in excess of the maximum capacity of the brake motor as may well occur, for example, with the loss of a brake shoe or brake lining resulting from an inaccurate resetting of the adjusting device following the replacement of worn brake linings by new brake linings. Such brake failure could also occur when vibrations and forces arising during operation cause a loss of adjustment of the adjusting device but are not taken into account by the adjusting device.

It should also be noted that with this prior art adjusting device the braking stroke occurs after closing of the stop member and stop in opposition to the force exerted by the spring which is a component of the stop member, but that this stop member spring operates independently of any force exerted by the pretension spring and thus need not have a great strength.

In DE-OS No. 28 05 116 there is disclosed another adjusting device which is intended primarily for installation in a brake cylinder and which, except for the structure of its limit stop structure, also corresponds to the characteristics and functions of the general form of an adjusting device as described above. In this adjusting device there is provided for at least some adjustment of an excessive application stroke during the braking process, however, any excess stroke travel which exceeds this limit is subsequently adjusted only during the brake release operation. During the brake release, the storage spring of the limit stop device on the rotateable screw coupling member actuates the control clutch in the direction of opening only after the desired application stroke value has been exceeded. When there is an excessively long application stroke during the braking operation, the spring which is a component of the stop limit device must hold back the rotateable screw coupling member together with the other rod member once the desired stroke value has been reached against the force of the pretensioned spring until the control clutch has opened. Subsequently, an adjustment can only be carried out until that time that one rod member has moved an additional relatively small displacement which is sufficient to close the brake force transmitting clutch. This brief period of time which is available for any adjustment together with the selection of the relative spring strengths limits the adjustment of excessive brake application stroke during the braking process. Any remaining excessive stroke can only be adjusted during the subsequent brake release operation. It is therefore apparent from the functioning of this adjusting device that the spring of the stop limit device must be stronger than the pretension spring which in turn must be stronger than the relatively weak opening force required for the control clutch and which opening force is provided by another spring. The stop limit device spring must thus be relatively strong and consequently consumes a considerable quantity of the braking force exerted by the brake motor during brake application. This significantly reduces the force available for direct application to the braking surfaces. As a result, this adjusting device is disadvantageous in that it provides only for a partial adjustment of excessive application stroke during the braking process and also demonstrates a low degree of efficiency.

Adjusting devices have been proposed which are completely dissimilar from the initially described general form of an adjusting device. One such adjusting device is disclosed in GB-PS No. 1 397 360 which provides for a rotary clutch to be constructed with an axially moveable, spring loaded control member.

In DE-OS No. 23 37 420 there is disclosed an adjusting device which also deviates from the initially described characteristics and functions of a general adjusting device and which operates in a manner similar to that described in DE-OS 28 05 116 involving a braking force acting in the direction of pressure. The adjusting device of DE-OS No. 23 37 420 can be constructed into an adjusting device corresponding substantially to the adjusting device described in U.S. Pat. No. 3,326,335 which is stressed by a braking force acting in the direction of the traction force.

It is therefore the object of the present invention to provide a novel and improved device for adjusting the slack in brake linkage of a vehicle which permits the complete adjustment of any excess brake application stroke during the braking operation.

It is another object of the present invention to provide such an adjusting device which is simple in structure and reliable in operation.

It is a further object of the present invention to provide such an adjusting device having a considerably increased operating efficiency such that the adjusting device requires only a small portion of the braking force provided by the brake motor so as to enable the brakes to be applied with substantially the full braking force produced by the brake motor.

The objects of the present invention are achieved by providing an adjusting device of the type described herein wherein at least a portion of the control clutch is free and independent of the pretensioned force exerted by the pretensioned spring. Since the control clutch is unstressed by the pretension spring, the control clutch can open immediately upon closing of the limit stop device and can carry out the adjustment of any excessive application stroke to the desired application stroke independently of the motion of the rod member connected to the brake motor as well as independently of any coordination of the involved springs. It is thus possible to employ a stop limit device spring which is independent of the strength of the pretension spring and thus the stop limit device spring can be relatively weak and this consequently contributes to a high degree of efficiency of the slack adjusting device.

According to one aspect of the present invention a device for automatic adjustment of the slack of brake linkage on a rail vehicle and the like may comprise two telescoping rod members at least one of which is tubular and one of the rod members is connected to the brake motor and the other rod member connected to the brake linkage. The rod members are coupled by a screw coupling which comprises two screw coupling members one of which is a nut threaded upon a spindle shaft having a non-self-locking thread. One of the nut and shaft is rotateable and is connected for limited axial movement to the brake linkage rod member and the other of the nut and shaft is nonrotateable and is rigidly connected to the brake linkage rod member. There is a moveable stop member which is engageable with a stop after traveling a distance corresponding to the desired slack in the brake linkage and a spring exerts a force to move the moveable stop member toward the stop and parallel to the direction of the brakiing force. A control clutch member is slideably mounted upon the rotateable screw coupling member for axial movement thereon and has a closed position in which the rotateable screw coupling member is coupled to the brake motor rod member. The control clutch requires a force which is substantially less than the force exerted by the moveable stop member spring to move out of its closed position to an open position. The control clutch member has a control element which is urged by the moveable stop member spring in a direction to close the control clutch member. There is a rotary clutch between the brake motor rod member and the rotateable screw coupling member to transmit braking force from this rod member to the rotateable screw coupling member when in the closed position and is displaceable into its closed position in a direction opposite to that of said control clutch member. There is a pretensioned spring between the rod members and this spring urges the brake motor rod member in a direction opposed to the braking force. The control clutch member is free of any force exerted by the pretensioned spring.

According to the present invention it is preferable to provide a substantially constant axial relative position of the rod members and the rotateable screw coupling member with respect to each other and at least a portion of the control clutch opens in the direction opposed to that of the braking force by providing that at least a portion of the control clutch can shift relative to the rod member and screw coupling members above.

The control clutch or at least a control clutch member may then be easily opened to adjust excessive application stroke during the braking operation only by an appropriately slight displacement of at least a portion of the control clutch member with respect to the rod members and the screw coupling member which retain their relative axial positions with respect to each other. The opening of the control clutch or the control clutch member thus occurs without any compression of the pretensioned spring and accordingly this opening is not impeded in any way by any force exerted by the pretensioned spring. The operation of the present adjusting device is thus a significant improvement over the prior art adjusting devices according to US-PS 3 326 335 or DE-OS 28 05 116 wherein the control clutch could only be engaged by a relative displacement of the rotateable screw coupling member with respect to a rod member under tension from the pretensioned spring and thus the control clutch had to open in opposition to the force exerted by this pretensioned spring.

Other objects and advantages of the present invention will be apparent upon reference to the accompanying description when taken in conjunction with the following drawings, which are exemplary, wherein;

FIG. 2 is a longitudinal sectional view of the adjusting device according to the present invention;

FIG. 3 is a detail in enlarged scale of a portion of the meshing gear teeth on the control clutch shown in FIG. 2;

Proceeding next to the drawings wherein like reference symbols indicate the same parts throughout the various views a specific embodiment and modifications of the present invention will be described in detail.

Figure 1:
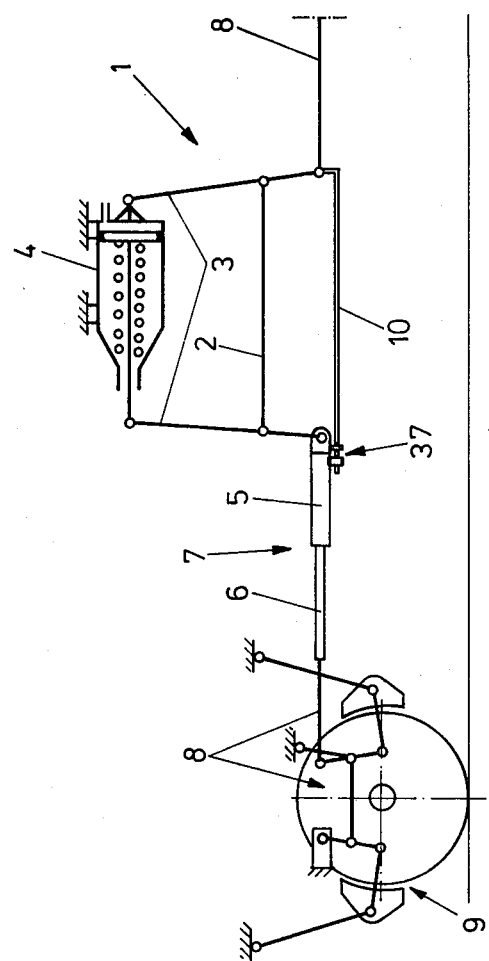
FIG. 1 is a diagrammatic view in elevation of the installation of the adjusting device according to the present invention with respect to the brake linkage and brake motor on a rail vehicle.

As may be seen in FIG. 1, the adjusting device of the present invention is indicated generally at 7 and is installed in a standard H-type brake linkage and rigging indicated generally at 1 and comprising two brake levers 3 interconnected at substantially their central portions by a draw bar 2 and whose upper ends are pivotally connected to both ends of a brake cylinder 4 which functions as the brake motor. The other or lower end of the left brake lever 3 in FIG. 1 is pivotally connected to a rod linkage member 5 which together with another telescopingly adjustable rod linkage member 6 forms the adjusting device 7. The rod member 6 is connected to a standard H-shaped linkage forming brake linkage 8 as utilized for a friction brake 9 of a brake system wherein a brake shoe is engageable with a wheel of the vehicle.

The lower end of the right brake lever 3 is connected to a brake rod linkage 8 (not illustrated) which in turn is connected to another friction brake (not illustrated) without the insertion of an adjusting device and also to a control rod 10. The control rod 10 has one end coupled to the adjusting device 7 by a stop limit device indicated generally at 37. The adjusting device 7 is thus incorporated or installed in the brake system in the conventional manner as known in the art.

The adjusting device 7 is illustrated in greater detail in FIG. 2 in which there is shown the rod member 5 which is essentially tubular in structure and has an end portion 11 directed away from the brake lever 3 and overlapping and telescopingly enclosing a similar tubular structured rod member 6 which is axially displaceable therein. The two rod members, 5 and 6, are respectively connected to brake lever 3 and brake linkage 8 in such a manner that they cannot rotate about their common longitudinal axis.

The rod members 5 and 6 define therebetween an annular space 12 in which is positioned a pretensioned spring 13 which exerts its pretensioned force against rod member 6 in the ddirection to retract this rod member within the rod member 5. The adjusting device 7 also includes a screw coupling which comprises a nut 14 rigidly connected at the end of the rod member 6 directed away from the brake linkage 8 and a threaded spindle shaft 15 which is screwed into the nut 14 by a non-self-locking thread. The threaded spindle shaft 15 has one end which protrudes from the rod member 6 and projects into a head piece 16 of the rod member 5. The spindle shaft 15 is also provided with a segment 17 having longitudinal slots in its outer surface to function as a sliding seat and connected to the segment 17 is a flange shaped end member 18 on one side of which is provided a conical clutch surface 19 facing toward the rod member 6 and being a component of a rotary clutch 20. This end of the spindle shaft 15 is rotateably supported against the rod member 5 by a ball thrust bearing 21 in the direction of the braking force (shown by arrow 22) exerted upon the rod member 5 by the left brake lever 3. As may be seen in FIG. 2 which shows the adjusting device at rest, axially spaced from the clutch surface 19 is a correspondingly shaped conical clutch surface 23 formed on a portion of the rod member 5 and the rotary clutch 20 is defined by clutch surfaces 19 and 23.

An annular clutch member 24 is axially moveable upon the sliding seat on segment 17 but is nonrotateable and is limited in its axial displacement in the direction of the arrow 22 by a stop or abutment 25 on a radial portion of the end piece 18. The clutch member 24 can be coupled with the head piece 16 of the rod member 5 by a control clutch 26 constructed as a geared conical clutch which is closed when the adjusting device is at rest as shown in FIG. 2. The control clutch 26 has helical gear teeth 28 in the gearing between clutch surface 29 formed on the clutch member 24 facing substantially in the direction of the arrow 22 and the mating clutch surface 30 on headpiece 16 as shown in FIG. 3 which illustrates a cross section along the dashed line 27. The gear teeth 28 produce an opening force on the control clutch 26 when the gear teeth are subjected to a torque.

The clutch member 24 is supported in a direction opposite of the direction of arrow 22 by a roller bearing 31 against radially inwardly projections 32 formed on a plurality of pusher rods 33. A circular flange portion 34 on the clutch member 24 hooks behind the projections 32 on the side facing away from the roller bearing 31. The pusher rods 33 are axially parallel to rod members 5 and 6 and are positioned uniformly around the circumference of these rod members. The pusher rods 33 project slideably through openings in a necked-down or constriction portion 35 which is the transition between head piece 16 and end portion 11 of the rod meber 5. A tubular stop member 36 is moveably mounted on the outer peripheral surface of the rod member 5 and forms a component of the limit stop device 37. The moveable stop member 36 is opposed in the direction of the arrow 22 by a flange shaped stop 38 mounted on the control rod 10 and spaced a distance from the moveable stop member 37 which corresponds to the desired slack or brake application stroke of the friction brake 9. It is to be understood that the brake surfaces become engaged only after a preliminary portion of the brake application stroke overcomes slack in the brake rigging and linkage.

In substantially the center portion of the moveable stop member 36 there is formed an annular radially inwardly extending flange 39 whose surface facing in the direction of the arrow 22 forms an impact clutch 40 for the ends of the pusher rods 33 which are directed away from the direction of the arrow 22. The other surface of the annular flange 39 is engaged by one end of a spring 41 which functions as a component of the stop limit device 37 and whose end away from the direction of the arrow 22 is supported by an annular flange 42 formed on the end portion 11 of the rod member 5. A small spring 43 which is weak in strength in comparison with springs 13 and 41 is positioned between the head piece 16 and projections 32 or pusher rods 33 in such a manner that the spring 43 urges the pusher rods 33 in the closing direction of the impact clutch 40.

When the adjusting device 7 is at rest and when the brakes are in the released position, the components of the adjusting device will be in the positions as shown in FIG. 2. The pretension spring 13 exerts a force in the direction of arrow 22 upon the spindle shaft 15 through the nut 14 and the shaft 15 is supported by the ball 21 upon the rod member 5. The control clutch 26 is thus held in its closed position by the spring 41 acting through the annular flange 39, impact clutch 40, pusher rods 33 with projections 32, ball bearing 31 and the clutch component 24. It is to be noted that the control clutch 26 is not stressed in any manner by any force exerted by the pretension spring 13. Any undesired impacts or forces exerted by brake linkage 8 upon the adjusting device 7 are thus not capable of disturbing or affecting in any manner the adjusting device. Any impacts exerted by the brake linkage 8 upon rod member 6 in the direction of arrow 22 are transmitted by nut 14 to the spindle shaft 15 and to the rod member 5 through ball 21. The clutch member 24 is thus relieved of any axial stresses or forces by the sliding seat of segment 17 and will experience only torque impacts of a very short duration which are not sufficient to disrupt or adversely affect the setting of the adjustment device 7. When any impacts or forces stress the rod member 6 in the direction opposite to that of the arrow 22, the rod member 6 will be slightly deflected toward the left as viewed in FIG. 2 against the force of the pretensioned spring 13 such that these axial displacements are absorbed by the slack or clearance with the abutment or stop 25. As a result, the clutch member 24 is similarly not subjected to any axial loads caused by any impact stresses on the rod member 6 and the control clutch 26 remains securely closed.

To initiate the braking operation, brake cylinder 4 is subjected to air under pressure whereupon the left brake lever 3 shown in FIG. 1 will exert a force upon rod member 5 in the direction indicated by the arrow 22 and the rod member 5 will be moved to the right as viewed in FIG. 2. This axial movement of rod member 5 is transmitted to the rod member 6 through end portion 11 and the pretensioned force of spring 13. The rod member 6 will then displace the friction brake 9 in the direction of application by actuation of the brake linkage 8. Simultaneously, the flange stop 38 will be moved to approach the stop member 36 to reduce the free play or clearance of the stop limit device 37.

If there is the proper or desired amount of slack in the release position of friction brake 9, the adjusting device 7 will move to the right as a rigid unit as shown in FIG. 2 until the friction brake is actually applied or until that time that the braking surfaces come into contact but without the exertion of any braking force. At this instant of contact of the braking surfaces, the stop flange 38 will come into contact with the moveable stop member 36 thus closing the limit stop device 37.

As the rod member 5 continues to move in the braking direction shown by the arrow 22, the rod member 6 under compression of the pretension spring 13 will be held back because of the rapidly increasing resistance to movement exerted by friction brake 9 through brake linkage 8 while at the same time the stop 38 will prevent the moveable stop member 36 from moving any further to the right as a result of which the spring 41 is compressed. Together with the moveable stop member 36, the pusher rods 33 and the clutch member 24 which is coupled to the push rods 33 through projection 34 also come to a halt under the force of the spring 43 and the spindle shaft 15 is held back by the rod member 6 by the action exerted by nut 14.

Upon further movement of the rod member 5, the control clutch 26 will be opened which has no further consequence since there is an absence of a torque acting upon the spindle shaft 15. The opening of control clutch 26 is immediately followed by engagement of the clutch surfaces 19 and 23 to close rotary clutch 20. The rod member 5 thus applies a braking force through the closed rotary clutch 20 to move the rigidly held spindle shaft 15 and through nut 14 also move rod member 6 which results in the firm application of braking force to the friction brake 9 through any resiliency which may exist in the brake linkage 8. At this point, the moveable stop member 36 which is also under the compression force of spring 41 is held back by stop 38 but the impact clutch 40 is released and pusher rods 33 as well as the clutch member 24 follow the movement of rod member 5 with the control clutch 26 in the open position.

Upon subsequent release of the braking action, the above described components function in substantially the opposite manner. With a decrease of braking force exerted by brake lever 3 in the direction of arrow 22 upon the rod member 5, the diminishing tension of the friction brake 9 and brake linkage 8 will draw the adjusting device 7, except for the moveable stop member 36 which remains in contact with stop flange 38, toward the left until the friction brake 9 is only loosely applied. If there is the proper released position play of friction brake 9, the impact clutch 40 will close during this release phase.

Upon further movement of rod member 5 toward the left, and in view of the extending of pretension spring 13, the rod member 6 together with brake linkage 8 and the spindle shaft 15 as well as the moveable stop member 36 will remain stationary together with the pusher rods 33, bearing 31 and clutch member 24 which are under action of the spring 43. The rotary clutch 20 will now open and the control clutch 26 will close so that the spindle shaft 15 which had disengaged itself from ball 21 during the actual application of braking force to the friction brake while the rotary clutch 20 was closed once again comes into contact with the ball 21.

As the release stroke of rod member 5 continues toward the left, the spindle shaft 15 held against rotation by the closed clutch 26 is moved along by ball 21 as is rod member 6 also moved along by nut 14 which results in the disengagement of friction brake 9 acting through the brake linkage 8. At the same time, the closed control clutch 26 moves clutch component 24, ball bearing 31 and pusher rods 33 and the closed impact clutch 40 moves the stop member 36 when the stop limit device 37 is released from the movement of the rod member 5. Upon termination of the brake release phase of rod member 5, the friction brake is released using a desired or proper application stroke distance and the stop limit device 37 is opened to a distance which corresponds to this desired application stoke. At this point, the starting positions of all of the components in the "at rest" position has again been achieved.

If, at the beginning of a braking operation, there should be excessive slack in the friction brake 9 and linkage 8 so that there is an excessive stroke before the friction brake 9 is applied, braking action will occur as described above until the closing of the stop limit device 37 after the desired or proper application stroke distance has been travelled, when the adjusting device 7 shifts to the right as a unit. After the stop limit device 37 closes, there will be subsequent movement of the rod member 5 under the action of the stop flange 38 engaging the moveable stop member 36 but the friction brake 9 will still be open. The moveable stop member 36 will be held back under tension from the spring 41 and spring 43 will open the control clutch in the manner described above. During the opening or disengagement of control clutch 26, the spindle shaft 15 and the rod member 6, under the force of the pretensioned spring 13, will follow the movement of the rod member 5, the spindle shaft 15 is still in contact with the rod member 5 by ball 21.

When the control clutch 26 opens, the spindle shaft 15 is now free to rotate and the pretension spring 13 is now able to retract the rod member 6 into the end member 11 of rod member 5 such that the nut 14 and the non-self-locking thread cause the threaded spindle shaft 15 to rotate. During this phase, it is essential that the spindle shaft 15 follows the movement of rod member 5 under the influence of the axial force exerted by pretension spring 13 and thus the rotary clutch 20 cannot be closed as a result of the continued movement of the rod member 5. The spindle shaft 15 will continue to rotate and thus retract the rod member 6 until the braking surfaces of friction brake 9 come into contact. During this phase of the shortening of the adjusting device, with respect to the total travel, the rod member 5 has undergone only an insignificant shift to the right and the magnitude of the desired application stroke is thus distorted by a negligibly small quantity.

After engagement of the friction brake 9, the rapid increase in the resistance to movement will hold the rod member 6 back under the compression force of pretension spring 13, spindle shaft 15 is also held back by the action of nut 14 but is disengaged from ball 21, and the rotary clutch 20 closes. During the subsequent braking action, rod member 5 will move spindle shaft 15 and nut 14 by means of the rotary clutch 20 as has already been described with respect to firm braking action and the friction brake 9 will be firmly engaged. It is thus apparent that as early as the initial braking action a shortening of the adjusting device will occur which causes the excessive application stroke of friction brake 9 to be reduced to the desired application stroke. The adjusting device thus acts instantaneously and completely. It is further pointed out that the adjustment is not limited in its displacement magnitude by any further movement by the rod member 5 or by appropriate relative strengths of the springs but rather it is accomplished completely until the desired or proper magnitude of the application stroke is attained.

The subsequent release of the applied brakes is accomplished in the same manner as described above.

In the event that the application stroke of friction brake 9 is less than the desired application stroke, i.e. there is insufficient slack in the brake linkage at the beginning of a braking operation, the friction brake 9 will contact the braking surface (wheel) upon an initial displacement of the rod member 5 to the right but before the moveable stop member 25 engages stop flange 38. Often additional movement of the rod member 5, rod member 6 and nut 14 will remain stationary as a result of rapidly increasing resistance to movement which also causes the spindle shaft 15 to be held back and to become disengaged from the ball 21. With only a slight additional displacement of rod member 5 together with the moveable stop member 36 under the action of spring 41 and movement of the pusher rods 33 actuated by the closed impact clutch 40 as well as bearing 31 and clutch member 24 which axially shifts upon segment 17 of the stationary spindle shaft 15, the abutment 25 upon end piece 18 will move in a direction opposite to that of the arrow 22 to engage clutch member 24. During continuing displacement of rod member 5, the spindle shaft 15 will hold back clutch member 24 by means of the abutment 25 as well as hold back the moveable stop member 36 by bearing 31 and impact clutch 40 until control clutch 26 is open. When the control clutch 26 is opened, the spindle shaft 15 becomes rotateable and under the axial stress exerted by spring 41 in the direction of the arrow 22 will unscrew itself from nut 14 to follow the further movement of rod member 5.

In this phase, forces transmitted by the spring 41 to the spindle shaft 15 through the moveable stop member 36, pusher rods 33, axial bearing 31, clutch member 24 and the closed abutment 25 all of which will follow further movement of the rod member 5.

During these operations all of which have occurred since the application of friction brake 9, the rod member 5 has only travelled a negligibly small distance with respect to the total length of the stroke. This small distance is the distance necessary for closing of the abutment 25 with the clutch member 24 as well as the opening stroke for control clutch 26. This small distance will distort the desired brake application stroke by a negligibly small amount.

As the rod member 5 continues its movement, the spindle shaft 15 will follow this movement while unscrewing itself toward the right out of nut 14 until the moveable stop member 36 engages stop flange 38 to close the limit stop device 37. During this operation, the adjusting device has become elongated (by the withdrawal of rod member 6 from end member 11 accompanied by compression of the pretension spring 13) to such an extent that the application stroke for friction brake 9 has been increased to its desired or proper magnitude. As the rod member 5 continues to move, the closed limit stop device 37 will hold back the moveable stop member 36 and spring 41 will be compressed. Correspondingly, spring 43 will hold back pusher rods 33 as well as clutch member 24 by means of projection 34 and the spindle shaft 15 will no longer be subjected to any axial stress. The spindle shaft 15 will now come to a halt, rotary clutch 20 closes and rod member 5 will take along with it during its subsequent movement in the direction of arrow 22 by means of closed rotary clutch 20 the again unrotateable threaded shaft 15, nut 14 and rod member 6 so as to firmly apply the friction brake 9, in the manner as described above. During this portion of the braking stroke when braking force is actually applied by the braking surfaces, pusher rods 33 and clutch member 24 will follow the movement of rod member 5 but moveable stop member 36 will be held back by the limited stop device 37 as a result of the force exerted by spring 41.

It is therefore apparent that even when the brake application stroke of friction brake 9 is too small at the start of a braking operation, correction or adjustment of the application stroke occurs when the brake shoe contacts the surface of the wheel but without exerting any force. The adjusting device is therefore immediately and completely effective for the situation where there is insufficient slack in the brake rigging and the application stroke is too short.

The subsequent release of the brake occurs in the manner as previously described above.

It is to be noted that in every functional phase of adjusting device 7 the pretension spring 13 and the spring 41 act completely independently of each other and thus their relative strengths can be selected independently of each other and the strengths can be so selected that the springs will definitely perform those functions and move those components which are intended to be moved by the respective springs. Spring 41 which is a component of the stop limit device 37 can thus have a relatively weak strength independently of the strength of spring 13. As a result, during a braking operation spring 41 will consume only a slight portion of the braking force for its compression and the degree of efficiency of the adjusting device is correspondingly high. Spring 43 should be weaker than pretension spring 13 and weaker than spring 41.

It will be apparent from the preceeding description of the functioning of the adjusting device that spring 43 in certain functional phases opens the control clutch 26. As a modification of this described embodiment, the tooth profiles 28 need not be helical so as to produce an opening force when stressed by torque but the teeth can be constructed with profiles which are substantially perpendicular to the direction of the torque. However, it is also possible to effect the opening of control clutch 26 not only by the spring 43 but to use the torque which stresses control clutch 26 when the gear teeth of control clutch 26 are constructed as shown in FIG. 3 with helical tooth profiles 28. In such a structure, clutch member 24 will be forced away from contact with mating clutch surface 30 of rod member 5 upon the application of torque whereby an appropriate amount of torque can also cause the control clutch 26 to open against the force of spring 41. By the appropriate shape of the tooth profiles 28, the spring 43 can thus be made even weaker in strength or may even be omitted completely without essentially altering the functioning of adjusting device 7.

When worn brake linings in friction brake 9 are replaced by new brake linings, the adjusting device may be reset by merely pushing back the brake shoes of friction brake 9. During the reset operation, rod member 6 will be pulled out of end piece 11 against the force of pretension spring 13 toward the left as viewed in FIG. 2. This movement of rod member 6 will also take along spindle shaft 15 by means of nut 14 until after abutment 25 has closed. Clutch member 24 will also be moved along against the force of spring 41 and control clutch 26 will disengage. Rotary clutch 20 is still in the open position at this time. With the further withdrawal of rod member 6, spindle shaft 15 screws itself into nut 14 in a direction to the right under axial stress from spring 41 which results in the resetting of the adjusting device. After resetting, control clutch 26 once again engages. It is essential that upon the next braking operation any excessive resetting stroke is immediately adjusted at the beginning of the braking operation so that the braking action is not in any way impaired by any such excessive resetting stroke.

Figure 4:
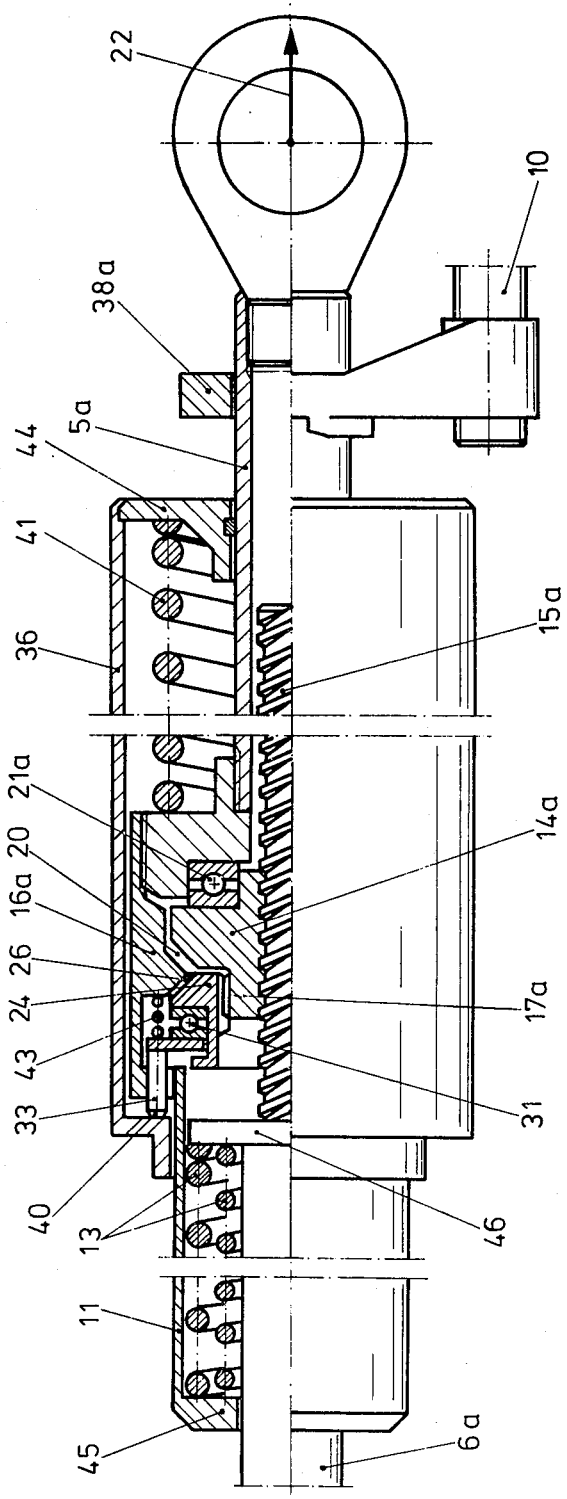
FIG. 4 is a half longitudinal sectional view of a second modification of the adjusting device.

The adjusting device of FIG. 2 can be modified merely by making nut 14 the rotateable screw coupling member instead of the spindle shaft 15. Such a modification is illustrated in FIG. 4. In the modified adjusting device of FIG. 4, the components corresponding to those shown in FIG. 2 are designated with the same reference numerals and components which have equivalent functions have a subscript "a" as compared to those shown in FIG. 2.

In the modified slack adjusting device of FIG. 4, the tubular rod linkage member 5a overlaps a portion of the threaded spindle shaft 15a with radial clearance therebetween. The spindle shaft 15a is rigidly connected with the rod-shaped rod linkage member 6a. Stop flange 38a is slideable on rod member 5a and is mounted upon rod 10. Spaced from the stop flange 38 by a distance corresponding to the desired application stroke is the stop member 36 which is moveably mounted on rod member 5a and on the end portion 11 which is rigidly connected to the rod member 5a. A tubular component 16a which corresponds to head piece 16 of FIG. 2 is inserted between the tubular section of rod member 5a and end portion 11 and surrounds nut 14a which is rotateable therein. Nut 14a is screwed by a non-self-locking thread onto the threaded spindle shaft 15a and is supported rotateably against rod member 5a by ball bearing 21a which corresponds to ball 21 in the direction of the braking force. The nut 14a can be coupled with tubular component 16a or the rod member 5a by means of the rotary clutch 20. A segment 17a of nut 14a is coupled to clutch member 24 by a sliding seat which permits only axial movements but prevents any relative torque. The clutch member 24 can, on the one hand be coupled with component 16a or rod member 5a and, on the other hand is supported by the antifriction bearing 31 against pusher rods 33 which are stressed by spring 43. The pusher rods 33 are supported against the moveable stop member 36 by impact clutch 40 in a direction opposite to that indicated by the arrow 22. Spring 41 surrounds the tubular portion of rod member 5a and is inserted between tubular component 16a of rod member 5a and a front wall 44 of moveable stop member 36 which is spaced from stop flange 38a. Pretension spring 13 is inserted between a front wall 45 of end portion 11 and a flange 46 at the transition area between the rod portion of rod member 6a and threaded spindle shaft 15a.

When the substitution of rotateable or rigid mounting of spindle shaft 15 or 15a and nut 14 or 14a as rotateable or a rigid screw coupling member is considered, it will be apparent that the adjusting device disclosed in FIG. 4 fully corresponds to the adjusting device disclosed in FIG. 2 and it is thus considered that the detailed description of the functioning of the adjusting device of FIG. 4 is not necessary.

Figure 5:
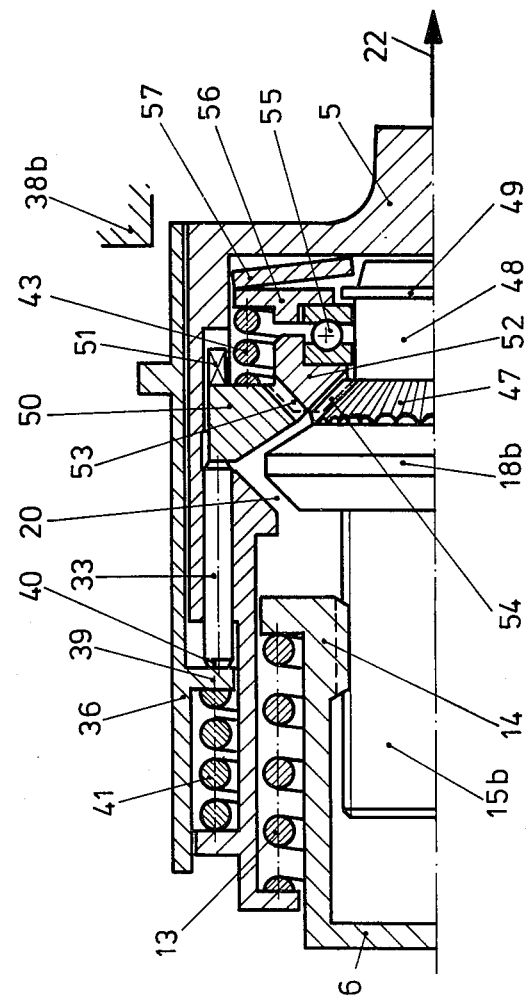
FIG. 5 is a view similar to that of FIG. 4 and showing a third modification of the adjusting device.
Figure 6:
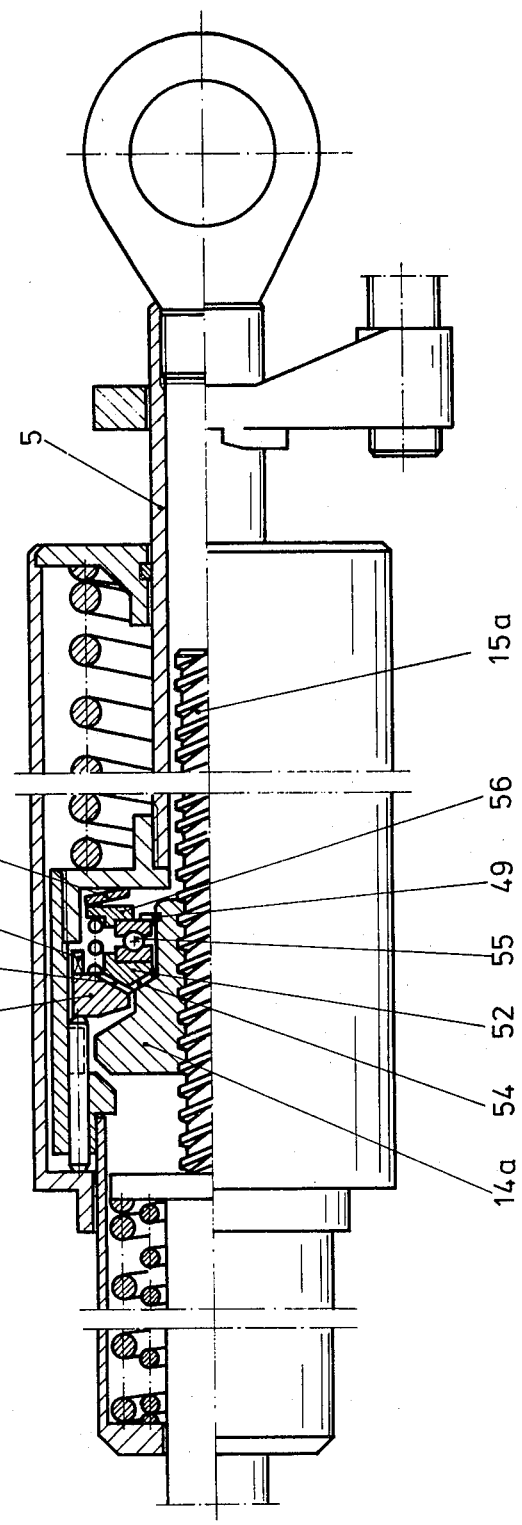
FIG. 6 is a view similar to that of FIG. 4 and showing a fourth modification of the adjusting device.

In the adjusting devices of FIGS. 5 and 6, there are modifications in the region of the control clutch as described in the previously disclosed adjusting devices. However, the various functions of these adjusting devices are substantially equivalent to those previously described.

The modification according to FIG. 5 has its threaded spindle shaft as the rotateable screw coupling member corresponding to the structure as shown in FIG. 2 and is thus comparable to the adjusting device of FIG. 2. Like components are therefore designated with the same reference numerals as in FIG. 2 and those components correspond to each other have been designated with subscript "b".

The adjusting device of FIG. 5 has two nonrotateable rod linkage members 5 and 6 between which the pretension spring 13 is inserted. A nonrotateable nut 14 is connected to the rod member 6 and is screwed upon a rotateable spindle shaft 15b having a non-self-locking thread. The spindle shaft 15b has a flange portion 18b on one side of which is formed rotary clutch 20 with respect to rod member 5 and on the other side of which there is a clutch surface 47 which may be in the form of conical teeth. Attached to the clutch surface 47 is a cylindrical segment 48 which terminates in an annular flange 49. The end of spindle shaft 15b which faces in the direction indicated by arrow 22 is positioned only a small distance from an interior wall surface of the rod member 5.

A moveable stop member 36 is mounted on the outer peripheral surface of rod member 5a and is directed toward an abutment 38b which corresponds to stop flange 38 in FIG. 2 at a distance corresponding to the desired or proper application stroke in the direction of arrow 22. Between annular flange 39 on stop member 36 and rod member 5 there is spring 41. The annular flange 39 is in contact with the ends of pusher rods 33 by an impact clutch 40 in the direction of arrow 22. The pusher rods 33 are slideably positioned within a radial wall of the rod member 5. Within the rod member 5, the pusher rods 33 are in contact with a circular member 50 which surrounds the spindle shaft 15b substantially within the area of clutch surface 47. The circular member 50 is axially moveable by means of axial gearing 51 but cannot rotate within the rod member 5. The circular member 50 has an inner conical clutch surface facing in the direction of arrow 22 which together with a correspondingly mating clutch surface on a circular insert member 52 forms a first rotary clutch 53 for the control component of adjusting device 7. The circular insert member 52 has a second conical clutch surface facing away from the direction indicated by arrow 22 which together with clutch surface 47 forms a second rotary clutch 54 for the control component. The side of insert 52 in the direction of arrow 22 is supported against an annular flange 56 by a axial thrust bearing 55 and the flange 56 is in turn supported by a disk spring 57 against a wall of the rod member 5. The bearing 55 is moveably positioned on segment 48 and a gap which corresponds to at least the opening stroke of the second rotary clutch 54 exists between axial bearing 55 and annular flange 49 when the second rotary clutch 54 is closed. A weak spring 43 is inserted between circular member 50 and annular flange 56. The two rotary clutches 53 and 54 represent partial clutch components of a control clutch.

FIG. 5 shows the components in their positions when the adjusting device is at rest. Spring 41 acting through pusher rods 33 and circular member 50 holds the first rotary clutch 53 closed against the force exerted by spring 43. The force exerted by spring 41 is transmitted from the first rotary clutch 53 through insert member 52, axial bearing 55, annular flange 56 and disk spring 57 back to the rod member 5 upon which the spring 41 is supported. Acting through nut 14 as well as through spindle shaft 15b the pretension spring 13 exerts a force on the second rotary clutch 54 in a closing direction. The flow of force of pretension spring 13 is then completed through insert member 52, bearing 55, annular flange 56 and disk spring 57. Thus, the spindle shaft 15b is held against rotation by the two closed rotary clutches 54 and 53 as well as by the action of axial gearing 51 whereby rotary clutch 53, as a partial clutch component of the control clutch, is relieved of force exerted by the pretension spring 13.

During brake application and brake release, the adjusting device operates in the same manner as described for the corresponding action of the adjusting device disclosed in FIG. 2.

During the application of the brake when there is an amount of slack equal to the desired slack or application stroke, the adjusting device of FIG. 5 will initially move as a complete unit in the direction of braking force arrow 22 until that time that the friction brake comes in contact with the wheel surface and stop member 36 contacts abutment 38b. As rod member 5 continues its braking movement, the stop member 36 as well as rod member 6 are restrained against movement, spindle shaft 15b with insert 52 as well as circular member 50 are also brought to a halt when rotary clutches 53 and 54 close and rotary clutch 20 closes. As rod member 5 continues to move to exert a braking force upon brake shoe against the wheel, the spindle shaft 15b which is held against rotation by nut 14 together with rod member 6 are moved along to effect a firm application of friction brake 9 while stop member 36 under tension from spring 41 and as a result of the opening of impact clutch 40 is held back. It should be noted that during a braking application using the adjusting device of FIG. 5, spindle shaft 15b is held rigidly against any rotation by the action of rotary clutches 20, 53 and 54 even during the transition from contact of the braking surfaces to the firm application of a braking force without any interruption.

During the subsequent brake release operation the correspondingly reverse procedures occur.

When the application stroke is excessive during a braking operation, the stop member 36 will be restrained by abutment 38b after the desired application stroke has been traversed. Upon subsequent movement of rod member 5 spring 43 will open the first rotary clutch 53 and the spindle shaft 15b now becomes rotateable. As a result, the pretension spring 13 can push rod member 6 quickly to the right until the friction brake is applied whereupon nut 14 acts to impart rotation to the spindle shaft 15b which screws itself into the nut 14. The second rotary clutch 54 remains closed during this phase and circular insert 52 rotates with spindle shaft 15b. In this manner, an excessive application stroke of the friction brake is adjusted during the braking operation to the desired or proper application stroke by a shortening of the adjusting device.

After contact of the braking surfaces, the rapidly increasing resistance to motion holds back rod member 6, spindle shaft 15b ceases its motion, rotary clutch 20 closes and during the subsequent brake clamping stroke of rod member 5 the now rigidly held spindle shaft 15b, nut 14 and rod member 6 are moved along by rotary clutch 20. Depending on the particular manufacturing tolerances, the first rotary clutch 53 may engage immediately prior to closing of rotary clutch 20 and as a result of the action of its axial gearing play will make possible a firm closing of rotary clutch 20. However, rotary clutch 53 may also remain open during the actual brake clamping stroke which follows the adjustment of an excessive application stroke and may not close until during the release phase during the transition from the brake clamping stroke to a pressureless friction brake contact under the force of spring 41. These different functions do not lead to any further consequences. The remainder of the brake release operation occurs as previously described.

If at the start of a braking operation friction brake 9 should have too small an application stroke, then upon contact or application of the friction brake the rod member 6 will be held back against the force of pretension spring 13 during the movement of rod member 5 in the braking direction of arrow 22 before stop member 36 contacts abutment 38b. As the rod member 5 continues to move in the braking direction, spring 41 will act to carry along the stop member 36, pusher rods 33, circular member 50 and by the closed rotary clutch 53 also carry along insert 52, axial bearing 55 and annular flange 56, but the spindle shaft 15b will be held back by rod member 6 acting through nut 14. upon the opening of the second rotary clutch 54, the axial bearing 55 will then come into contact with annular flange 49. Upon opening of the second rotary clutch 54, spindle shaft 15b becomes rotateable and follows the movement of rod member 5 in the braking direction of arrow 22 as a result of the contact between annular flange 49 and axial bearing 55 while unscrewing out of the nut 14. After the desired or proper application stroke has been travelled, stop member 36 will engage abutment 38b and will then be held back. As rod member 5 continues its movement in the braking direction, spindle shaft 15b together with insert 52 and circular member 50 will remain behind with rod member 6 until the rotary clutch 20 closes. Upon continued movement of rod member 5, rotary clutch 20 will act to move the now rigidly held spindle shaft 15b which through nut 14 moves rod member 6 for a firm application of force to the friction brake. At the beginning of this brake clamping stroke, the second rotary clutch 54 closes again and insert 52 and immediately thereafter circular member 50 are also moved along. Thus, even an insufficient application stroke is adjusted by the adjusting device according to the present invention during the process of applying the friction brake.

The subsequent brake release operation is carried out in the manner as previously described.

The adjusting device of FIG. 5 thus also provides for immediate and complete adjustment of an excessive or insufficient friction brake application stroke to the desired or proper application stroke distance.

In the adjusting device of FIG. 5, the spindle shaft 15b corresponds to the rotateable screw coupling member in the adjusting device of FIG. 2. However, the threaded spindle shaft can be constructed as the rigid or fixed screw coupling member and the nut as the rotateable screw coupling member in the device of FIG. 4. An adjusting device modified in this manner is shown in FIG. 6.

In its structure, the adjusting device of FIG. 6 corresponds to the adjusting device of FIG. 4 except that in place of the control component of FIG. 4 there is utilized the elements of FIG. 5 wherein there is a circular member 50 which is held against rotation by axial gearing 51 but is capable of axial movement. There is also an insert member 52, two rotary clutches 53 and 54, axial bearing 55 which can be intercepted by annular flange 49 and annular flange 56 which is supported against the rod member 5 by the action of the disk spring 57. Considering that the nut 14 as a nonrotataeable screw coupling member and spindle shaft as a rotateable screw coupling member of the adjusting device of FIG. 5 are replaced by nut 14a as a rotateable screw coupling member and spindle shaft 15a as a nonrotateable screw coupling member in the adjusting device of FIG. 6, the functioning of the adjusting device of FIG. 6 is identical to the adjusting device of FIG. 5. It is thus unnecessary to describe in detail the function and operation of the adjusting device of FIG. 6.

The adjusting devices of FIGS. 5 and 6 can also be reset in a similar manner to the adjusting devices of FIGS. 2 and 4 by forcing back the friction brake 9. If a force in excess of that exerted by pretension spring 13 is exerted upon the rod member 6 toward the left as seen in FIG. 5, then rod member 6 will be pulled out toward the left from rod member 5 when pretension spring 13 compresses. Initially, the nut 14 will take along threaded spindle 15b, rotary clutch 54 opens, annular flange 49 then comes into contact with axial bearing 55 and prevents spindle shaft 15b from moving any further to the left. As rod member 6 continues to be pulled out, spindle shaft 15b rotates and screws itself out of nut 14. As the pulling force applied to rod member 6 decreases, the adjusting device returns to the "at rest" position shown in FIG. 5.

If the brake linkage and rigging should exert any impact loads or shocks on the rod member 6 on the adjusting device of FIG. 5 in the direction of arrow 22 when the friction brake is in the release position, these impact loads are transmitted by nut 14, spindle 15b, rotary clutch 54, insert 52, axial bearing 55 and annular flange 56 to the disk spring 57 which in turn transfers these impact loads to the rod member 5 but in an attenuated manner after cushioning or damping. During this phase, the two rotary clutches 53 and 54 remain closed. Only in the event of extraordinarily heavy impacts will disk spring 57 be deflected sufficiently to permit spindle 15b to directly contact rod member 5 with its right hand surface. The disk spring 57 thus functions to limit impact loads on the control component of the adjusting device as shown in FIG. 5. In the adjusting device of FIG. 6 the disk spring 57 has a corresponding function. In the adjusting devices of FIGS. 2 and 4, a spring-loaded arrangement of ball 21 and/or antifriction bearing 21a is not required to the same extent since the control components of these devices are constructed to be relieved of impact loads by the sliding guides on segment 17 or 17a.

In a further modification of the above described adjusting devices, an adjusting device can also have its control clutch constructed in the form of a radially-positioned ratchet with a ratchet wheel and a holding pawl.

The ratchet wheel is rigidly connected to the rotateable screw coupling member and cannot rotate but is capable of axial movement at least in the direction of rotation of the rotateable screw coupling member used to adjust any excessive application stoke. The holding pawl is constructed such that it hooks into the ratchet wheel under spring pressure to lock the movement of the rachet wheel, at least in the above described direction of rotation. In this construction, the control component can be so structured that it lifts the holding pawl out of the ratchet wheel when movement in a direction opposed to the direction of the braking force is exerted relative to one of the rod members so that the ratchet wheel may rotate together with the rotateable screw coupling member. Such a lifting structure may comprise a cam or an inclined surface. The ratchet wheel can also be coupled with the rotateable screw coupling member by a freewheeling device in the opposite direction or the engagement of the holding pawl with the ratchet wheel can, in this opposed direction of rotation, be constructed to be self-releasing, such as by providing appropriate surfaces on the ratchet wheel teeth or on the holding pawl itself.

When a ratchet disk is employed which locks in both directions of rotation and the freewheeling device is omitted, a second control device must be provided.

Such a control device must lift the holding pawl out of its locking position when encountering a braking force stressing of the adjusting device which exceeds the force of the pretension spring, such as, for example, as a function of the relative shifting which occurs between one rod member and the rotateable screw coupling member.

As a modification of the above described structure, the coupling between the control components and holding pawl can also be constructed so that the control component holding pawl in the ratchet disk while the control component is in the "at rest" position and only releases its hold when it moves relative to one of the rod member or relative to the rotateable screw coupling member. The holding pawl thus disengages under pressure of a spring or as a result of the action of torque exerted upon the ratchet wheel. In addition, the freewheeling device may be replaced by a second partial clutch which is similar in its action to the second rotary clutch 54 shown in FIG. 5.

The functions of the adjusting devices when modified according to the several possible modifications described above are similar to those in the illustrated modifications and their operations will be readily apparent. An essential element of all modifications is that at least one partial clutch, such as the first rotary clutch 53 of FIG. 5 or the ratchet wheel mechanism of the control clutch or the control clutch 26 itself (in FIG. 2) can be engaged only by a shifting of the control component or one of its members relative to the rotateable screw coupling member and relative to the rod linkage member and that this engaging action does not require any relative shifting or displacement between the rotateable screw coupling member and one of the rod linkage members.

It will be understood that this invention is susceptible to modification in order to adapt it to different usages and conditions, and accordingly, it is designed to comprehend such modifications within this invention as may fall within the scope of the appended claims.

What is claimed is:

1. A device for automatic adjustment of the slack of brake linkage on a rail vehicle and the like, comprising first and second telescoping rod members at least one of which is tubular, one of said rod members being connected to a brake motor and the other rod member connected to brake linkage on a vehicle, a screw coupling between said first and second rod members and comprising first and second screw coupling members, one of said screw coupling members comprising a nut threaded upon the other screw coupling member comprising a spindle shaft having a non-self-locking thread, one of said nut and shaft being rotatable and connected for limited axial movement to said one rod member and the other of said nut and shaft being nonrotatable and rigidly connected to said other rod member, a moveable stop member engageable with a stop upon travelling a distance corresponding to the desired slack in the brake linkage, a first spring exerting a force upon said moveable stop member toward said stop and parallel to the direction of the braking force, a control clutch member slideably mounted upon said rotateable screw coupling member for axial movement thereon and having a closed position connecting said rotateable screw coupling member to said one rod member, said control clutch member requiring a force substantially less than the force exerted by said first spring to move out of its closed position to an open position, said control clutch member having a control element urged by said first spring in a direction to close said control clutch member, a rotary clutch between said one rod member and said rotateable screw coupling member to transmit braking force from said one rod member to said rotateable screw coupling member when in the closed position and displaceable into its closed position in a direction opposite to that of said control clutch member, a pretensioned second spring between said first and second rod members and urging said one rod member in a direction opposed to the braking force, said control clutch member being free of force exerted by said second spring.

2. A device as claimed in claim 1 and further comprising a rotateable thrust bearing supporting said rotateable screw coupling member against said one rod member in the direction of the braking force, said thrust bearing absorbing the pretensioned force of said second spring.

3. A device as claimed in claim 2 and said thrust bearing comprising a ball disposed upon the longitudinal axis of said rotateable screw coupling member and said one rod member.

4. A device as claimed in claim 1 wherein said one rod member and said rotateable screw coupling member have a substantially constant axial position relative to one another, said control clutch member being moveable axially relative to one rod member and said rotateable screw coupling member in a direction opposed to the braking force from its closed position to an open position.

5. A device as claimed in claim 1 and further comprising a third spring acting upon said control clutch member in a direction toward its open position.

6. A device as claimed in claim 1 and further comprising a control clutch between said control clutch member and said one rod member having helical gear teeth so that an opening force is produced when said control clutch is subjected to a torque.

7. A device as claimed in claim 1 wherein said control element is rotateable but axially coupled to said control clutch member, said moveable stop member having means thereon for defining an impact clutch engageable with said control element in the direction of the braking force, said control clutch member being nonrotateably mounted upon said rotateable screw coupling member and having a first clutch surface facing in the direction of the braking force and engageable with a corresponding second clutch surface on said one rod member.

8. A device as claimed in claim 7 wherein said one rod member has a radial wall portion with openings therethrough, said control element having a plurality of push rods passing through said openings in a direction opposite to the braking force, said push rods having first ends facing away from the direction of the braking force and engageable with said impact clutch means on said moveable stop member, said push rods having second ends facing in the direction of said braking force and having inwardly directed radial projections thereon supporting said control clutch member, and a stop on said rotateable screw coupling member engageable by said control clutch member to limit axial movement of said control clutch member in the direction of the braking force.

9. A device as claimed in claim 1 wherein said control clutch member is annular and surrounds said rotateable screw coupling member, a first clutch surface on said control clutch member engageable with a second clutch surface on an annular insert member to define a first rotary clutch, a thrust bearing supporting said annular insert member against said one rod member in the direction of the braking force, said insert member having a third clutch surface thereon engageable with a fourth clutch surface on said rotateable screw coupling to define a second rotary clutch.

10. A device as claimed in claim 9 wherein said thrust bearing is axially moveable upon said rotateable screw coupling member, a portion of said thrust bearing facing away from said annular insert being engageable in the direction of the braking force with a first annular flange on said one rod member and with a second annular flange mounted on said rotateable screw coupling member.

11. A device as claimed in claim 10 and further comprising a fourth spring acting upon said first annular flange in a direction opposite to that of the braking force.

* * * * *